(12) United States Patent
Foley

(10) Patent No.: US 9,242,694 B2
(45) Date of Patent: Jan. 26, 2016

(54) GAME CART BICYCLE ATTACHMENT DEVICE

(71) Applicant: Alan Foley, Red Bluff, CA (US)

(72) Inventor: Alan Foley, Red Bluff, CA (US)

(*) Notice: Subject to any disclaimer, the term of this patent is extended or adjusted under 35 U.S.C. 154(b) by 0 days.

(21) Appl. No.: 14/543,496

(22) Filed: Nov. 17, 2014

(65) Prior Publication Data

US 2015/0158548 A1    Jun. 11, 2015

Related U.S. Application Data

(60) Provisional application No. 61/912,240, filed on Dec. 5, 2013.

(51) Int. Cl.
| | |
|---|---|
| *B60D 1/14* | (2006.01) |
| *B62K 27/00* | (2006.01) |
| *B60D 1/52* | (2006.01) |

(52) U.S. Cl.
CPC .............. *B62K 27/003* (2013.01); *B60D 1/14* (2013.01); *B60D 1/52* (2013.01)

(58) Field of Classification Search
CPC .... B62D 63/061; B62B 7/126; B62K 27/003; B60D 1/14; B60D 1/42; B60D 1/44; B60D 1/46; B60D 1/52
USPC ......... 280/204, 292, 1.5, 30, 415.1, 495, 504, 280/514, 643
See application file for complete search history.

(56) References Cited

U.S. PATENT DOCUMENTS

| | | | |
|---|---|---|---|
| 2,468,894 A * | 5/1949 | Peek .............................. | 280/204 |
| 4,266,793 A | 5/1981 | Pryor | |
| 4,756,541 A | 7/1988 | Albitre | |
| 5,123,668 A | 6/1992 | Ligas | |
| 5,301,963 A * | 4/1994 | Chen ............................... | 280/30 |
| 5,482,304 A * | 1/1996 | Smith ........................... | 280/204 |
| 6,164,671 A | 12/2000 | Darling, III | |
| 6,431,570 B1 | 8/2002 | Lennon | |
| 2002/0096857 A1* | 7/2002 | Valdez et al. ................. | 280/293 |
| 2007/0187910 A1* | 8/2007 | Adams ........................... | 280/1.5 |

* cited by examiner

*Primary Examiner* — Anne Marie Boehler
(74) *Attorney, Agent, or Firm* — Daniel Boudwin; Global Intellectual Property Agency, LLC

(57) ABSTRACT

A game cart bicycle attachment device is provided that is configured to secure the handle end of a wheeled game cart to the seat post of a bicycle. The device comprises an elongated and angled member that attaches at a first end to the bicycle seat post and at a second end to a game cart. The second end comprises a T-shaped connection, whereby a lateral attachment bar attaches to opposing sides of the game cart and the angled member connects at a third location. The angled member includes a telescoping structure to offset the game cart, while furthermore the lateral attachment bar is telescopically adjustable to accommodate different game cart sizes. The ends of the lateral attachment bar include U-shaped clevises, while a third clevis is adjustably disposed along the angled member. The device therefore attaches to the game cart at three distinct locations along its U-shaped handle.

6 Claims, 3 Drawing Sheets

GAME CART BICYCLE ATTACHMENT DEVICE

CROSS REFERENCE TO RELATED APPLICATION

This application claims the benefit of U.S. Provisional Application No. 61/912,240 filed on Dec. 5, 2013. The above identified patent application is herein incorporated by reference in its entirety to provide continuity of disclosure.

BACKGROUND OF THE INVENTION

1. Field of the Invention

The present invention relates to bicycle carts and assemblies for connecting an existing cart to the seat post of a bicycle. More specifically, the present invention relates to a modular and adjustable connector assembly that secures the upper handle portion of a game cart to the rear seat post of a bicycle such that a user can trailer the game cart behind the bicycle when carrying game, equipment, or other supplies.

Removing catch or felled game from the field can be a labor intensive activity, particularly when hunting deer or other large game. After a kill, the animal needs to be removed from the field. This is generally accomplished either using a motorized vehicle or using a non-motorized vehicle, such as a game cart. Game carts are wheeled assemblies that include a carrying frame supported by one or two wheels, whereby the cart includes a handle for the user to lift and haul load placed on the frame through the field.

While removing game from the field can be facilitated using a motorized vehicle, such an ATV or pickup truck, in many areas it may not be possible to drive the vehicle to the required destination. Certain hunting areas are off limits to motorized vehicles, while others are too remote and rugged for the vehicle to travel. To resolve this issue, many hunters employ manual game carts to carry heavy loads, including game and gear. Over extended distances, however, use of a game cart alone can be tedious and require excessive transport time.

The present invention provides an assembly that is configured to secure a standard game cart to a bicycle seat post. The assembly comprises an adjustable structure that secures to the U-shaped handle of most game carts, thereby attaching the handle end thereof to a bicycle for enhanced movement thereof. In this manner, a user can employ a bicycle to transport heavy game or equipment, rather than handling the cart by hand and walking the cart to a desired location. This reduces time in the field, while the structure of the device can accommodate most any existing game cart with a U-shaped handle.

2. Description of the Prior Art

Devices have been disclosed in the prior art that relate to bicycle carts and the like. These include devices that have been patented and published in patent application publications. These devices generally relate to specific cart structures and those that attach in a diverse manner to a bicycle. The present invention is related to a universal attachment that secures an existing game cart to the seat post of a bicycle. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 6,431,570 to Lennon, which discloses a bicycle trailer assembly that comprises a frame that supports a trailer wheel and is connected to the rear frame of the bicycle by way of a front yoke. The rear frame is pivotably connected to the front yoke such that it can yaw relative to the bicycle, while the rear frame can support items thereon. The Lennon device, while discloses a device that secures to a bicycle and provides a trailer therefor, connects to the bicycle along the rear axle. The present invention contemplates a modular connector between the seat post of a bicycle and the handle portion of an existing game cart.

Another device is U.S. Pat. No. 5,123,668 to Ligas, which discloses a trailer hitch and cart for a bicycle, wherein the cart is cantilevered from a yoke that attaches to the bicycle. The yoke secures to an upwardly curved tow bar that pivotably connects to a swivel connector along the rear of the bicycle. Similar to the Lennon device, the Ligas device fails to provide a modular connector between the seat post of a bicycle and a standard, existing game cart having a U-shaped handle portion.

U.S. Pat. No. 4,756,541 to Albitre discloses a single-wheel trailer that supports an open mesh cart between the additional rear wheel and the rear wheel of a towing bicycle. A gooseneck tongue extends from the cart and couples to a hitch assembly secured to the seat post of the bicycle. Similar to the aforementioned devices, the Albitre device fails to contemplate a modular attachment member that can secure to an existing game cart and adjust itself to appropriately couple to the dimensions thereof.

U.S. Pat. No. 4,266,793 to Pryor discloses a hitch device for a bicycle that is configured to support a single wheel trailer from a ball joint supported from the seat post of the bicycle. A draw bar extends rearward from the ball joint and connects to a frame that supports a single rear wheel and a trailer basket. Similar to the above prior art, the Pryor device fails to contemplate the bicycle attachment frame of the present invention, which is configured to adjustably support an existing game cart assembly from the rear of the bicycle.

The present invention provides an elongated, T-shaped member that affixes the U-shaped handle of a game cart to the seat post of a bicycle. The assembly utilizes the wheels of the game cart and its frame as support for carried items, while providing an adjustable assembly that can accommodate different game cart sizes and dimensions. The device pivotably attaches the game cart to a bicycle seat frame and allows a user to deploy a non-motorized bicycle in the field, facilitating transport of supplies, equipment, and felled game.

It is submitted that the present invention is substantially divergent in design elements from the prior art, and consequently it is clear that there is a need in the art for an improvement to existing bicycle cart attachment devices. In this regard the instant invention substantially fulfills these needs.

SUMMARY OF THE INVENTION

In view of the foregoing disadvantages inherent in the known types of bicycle cart attachment devices now present in the prior art, the present invention provides a new attachment device that can be utilized for securing a game cart to the seat post of a bicycle.

It is therefore an object of the present invention to provide a new and improved bicycle cart attachment device that has all of the advantages of the prior art and none of the disadvantages.

It is another object of the present invention to provide a bicycle cart attachment device that is configured to secure an existing wheeled game cart to a bicycle seat post, whereby the game cart includes a U-shaped handle, a cart frame, and one or more wheels.

Another object of the present invention is to provide a bicycle cart attachment device that includes a T-shaped attachment end that secures to the handle of a game cart, whereby the device is adjustable to accommodate game carts of different size and design.

Yet another object of the present invention is to provide a bicycle cart attachment device that includes a bicycle post attachment end that secures around the post of a bicycle seat and provides a universal joint from which the device and the attached game cart can pivot.

Another object of the present invention is to provide a bicycle cart attachment device that includes several clevis connectors that secure the device to the U-shaped handle of a game cart, whereby no modification of the cart is required to attach the device.

A final object of the present invention is to provide a bicycle cart attachment device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
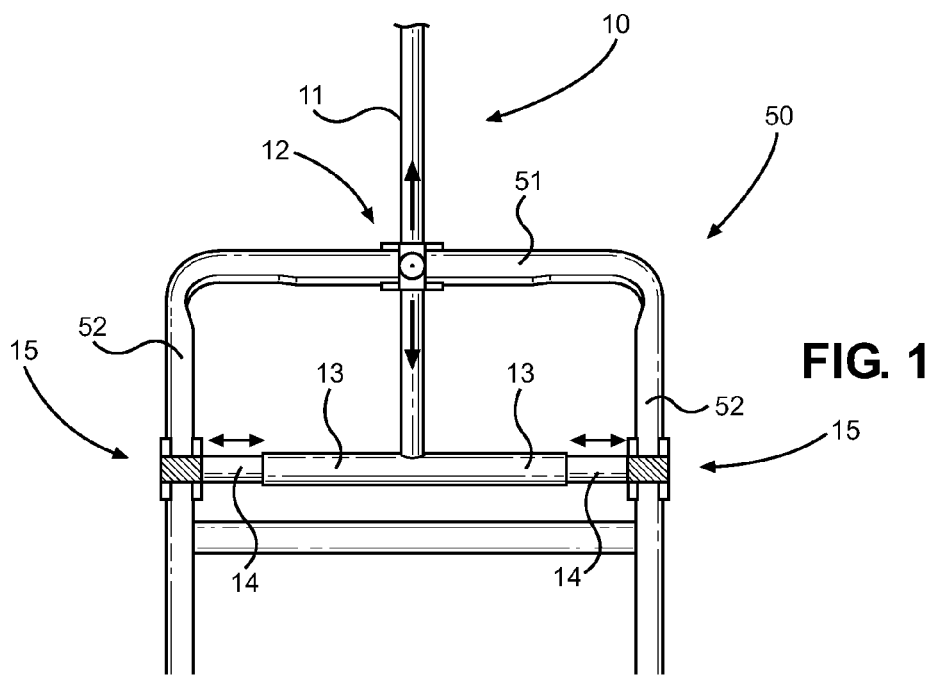
FIG. 1 shows an overhead view of the T-shaped attachment end of the present invention, whereby the attachment end is secured to the U-shaped handle of a game cart.

Reference is made herein to the attached drawings. Like reference numerals are used throughout the drawings to depict like or similar elements of the game cart bicycle attachment of the present invention. For the purposes of presenting a brief and clear description of the present invention, the preferred embodiment will be discussed as used for securing a game cart to the seat post of a bicycle to carry equipment and game in the field. The figures are intended for representative purposes only and should not be considered to be limiting in any respect.

Figure 2:
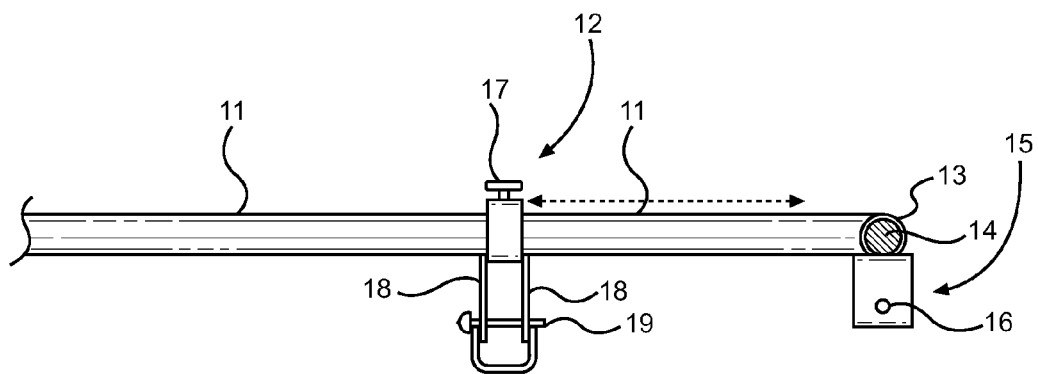
FIG. 2 shows a side view of the T-shaped attachment end of the present invention.

Referring now to FIGS. 1 and 2, there are shown views of the T-shaped attachment end 10 of the present invention, whereby the device at this end 10 secures to the U-shaped handle 50 of a game cart. The game cart handle 50 generally comprises a first and second upright member 52 and a crossbar member 51 forming an inverted U-shape. Generally this handle 50 is gasped by a user and manually pushed or pulled to haul cargo. The cargo is placed on the frame of the game cart, which is supported by a pair of wheels. In this way, the game cart acts as a wheeled cart in a similar way as a wheel barrow or wheeled dolly.

The present invention contemplates a device that attaches a game cart to a bicycle using an adjustable assembly that can conform to the dimensions of the given game cart and use the handle 50 of the game cart to pull cargo in much the same manner as conducted manually. The device extends between the seat post of a bicycle and connects at three distinct locations along the handle 50 of the game cart, allowing the user to pedal the bike to haul the game cart, and therefore the cargo thereon. The attachment end 10 of the device forms a T-shape, whereby the distal end of an angled member 11 terminates at a junction with a lateral attachment bar 13. The lateral attachment bar 13 is substantially orthogonal to the angled member 11, while the angle member 11 is one that extends upwards and forwards towards the seat post of the attached bicycle. The angled member 11 attaches to the bicycle at a first, bicycle attachment end, and to the game cart at a second, game cart attachment end 10.

The lateral attachment bar 13 of the T-shaped attachment end 10 comprises at telescopically extending structure that can extend outward and attach to opposing sides of the game cart handle (e.g. the upright member 52). Telescoping portions 14 of the lateral attachment bar 13 extend outward and terminate at a handle attachment clevis 15. The clevises secure over the upright members 52 of the handle and are secured thereto using a fastener 16. In this way, the handle 50 is secured along two opposing sides.

Similarly along the angled member 11, adjacent to the junction with the lateral attachment bar 13, is a third clevis member 12. The third clevis member 12 secures over the crossbar member 51 of the game cart handle 50, and forms the third attachment point for the device of the present invention. In this way, the T-shaped attachment end 10 secures at three points to the handle 50 of the game cart and extends therefrom. This provides a secure attachment between the angled member 11 of the present invention, whereby the handle 50 of the game cart can be towed by a bicycle and separation of the angled member 11 and the game cart is prevented.

Referring specifically to FIG. 2, there is shown a side view of the T-shaped attachment end 10 of the present invention, as well as a side view of the clevis members 15, 12. The first and second clevis member 15 are inverted U-shapes that extend downward from the telescoping portions of the lateral attachment bar 13. The clevises 15 surround the upright members of the game cart handle. A fastener (i.e. a pin, bolt, etc.) is inserted through complementary holes 16 in each clevis 15 to secure each upright member within its respective clevis 15. Similarly, the third clevis member 12 along the angled member 11 secures over the crossbar member of the game cart handle. Two flanges 18 of the clevis, as with the first and second clevis member, extend downward along opposite sides of the cross bar member, whereafter a securing fastener 19 is inserted through complementary holes in the flanges 18 to secure the cross bar member therein.

To facilitate positioning of the clevis members 15, 12 in the correct location based on the size of the game cart handle, the first and second clevis members 15 extend outward along the telescoping portions 14 of the lateral attachment bar 13. This allows positional adjustment of the first and second clevis member, whereby the two clevises can be extended sufficiently apart to capture the two opposing upright members of the handle. Likewise, the third clevis member 12 is adjustable along the length of the angled member 11. A spring biased pin lock 17 or similar locking mechanism locks the sliding joint at this clevis 12 location. This allows the third clevis 12 to slide along the angled member 11 and lock into place, thereby adjusting for the size of the game cart handle. The spring biased pin lock 17 is one location mechanism embodiment; however any locking fastener suitable for securing the sliding clevis to the angled member is contemplated.

Figure 3:
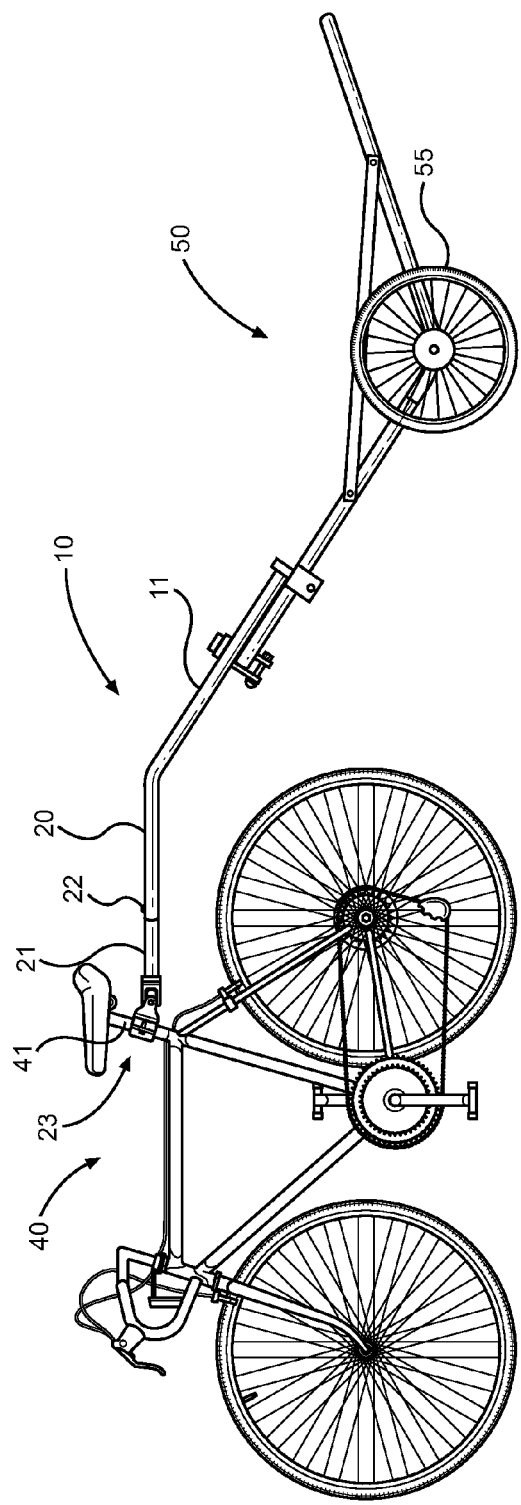
FIG. 3 shows a side view of the game cart bicycle attachment of the present invention in a working state, supporting a game cart from the rear of a bicycle.
Figure 4:
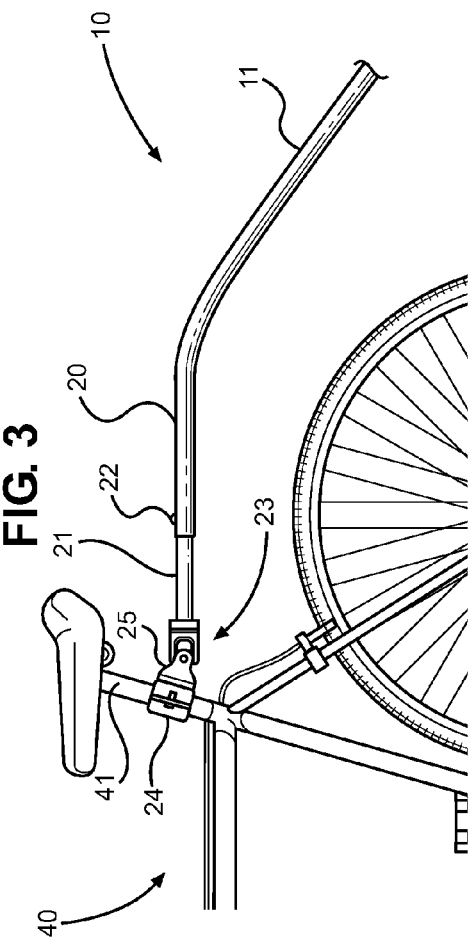
FIG. 4 shows a closer view of the bicycle post attachment end of the device, whereby the device secures to the seat post of a bicycle and includes a pivot joint.

Referring now to FIGS. 3 and 4, side views are shown of the present invention in a working state are shown. Extending upwards and away from the handle of the game cart, the angled member 11 secures the game cart to the seat post 41 of a bicycle 40. The angled member 11 includes a substantially horizontal portion 20 and an angled portion 11, whereby the horizontal portion 20 extends from the seat post in a substantially horizontal orientation, while the angled portion 11 supports the game cart handle at an angle. The angle is the same or substantially the same angel in which the handle would be positioned when personally handling the cart 50. This allows the frame of the cart to support cargo as it would normally, with the handle elevated and the wheels 55 of the cart supporting the frame while the cart is in motion.

The end of the angled member opposite of the T-shaped cart attachment end is the bicycle post attachment end 23. This end 23 includes a clamp 24 that surrounds and secures to a bicycle post 41, and furthermore provides a universal joint 25 attachment to the angled member 11. The universal joint provides multi-axis rotation of the angled member 11 as the cart 50 is hauled and the wheels of the bicycle and the cart go over different terrain.

To accommodate the size of the bicycle 40 and the offset between the bicycle seat post 41 and the game cart 50, the horizontal portion 20 of the angled member 11 comprises a telescoping portion 21. The telescoping portion extends the length of the horizontal portion 20, which is locked into place using an appropriate fastener 22 to prevent unwanted sliding after installation. In this way, the length of the horizontal portion 20 of the angled member 11 can be adjusted, thereby offsetting the angled member 11 and the game cart from the rear tire of the bicycle.

Figure 5:
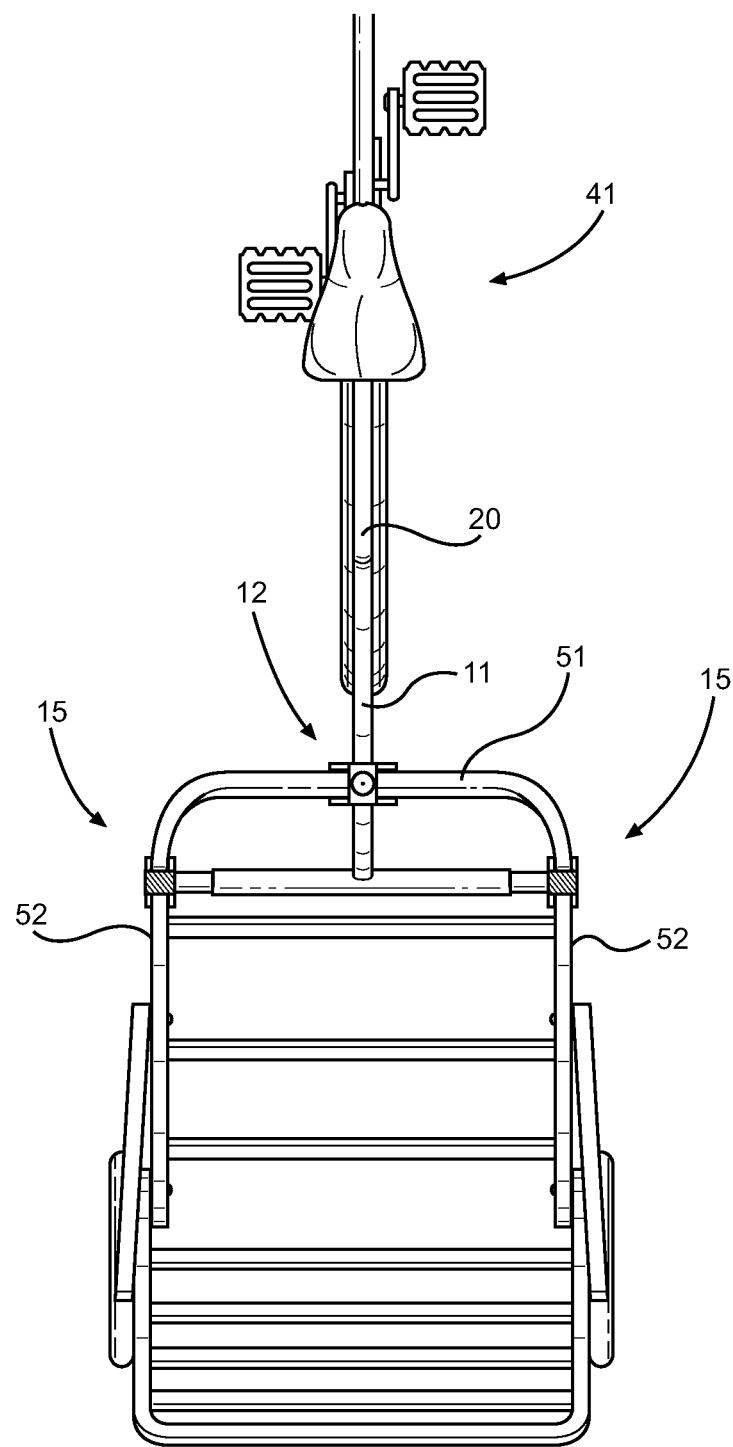
FIG. 5 shows an overhead view of the game cart bicycle attachment of the present invention in a working state.

Referring now to FIG. 5, there is shown an overhead view of the game cart bicycle attachment of the present invention in a working state. In operation, the T-shaped cart attachment end of the device secures in three locations along the handle of the game cart. The first and second clevises 15 secure to the first and second upright members 52 of the handle, while the third clevis 12 secures to the crossbar member 51 of the handle. The angled member 11 extends from the attachment end towards the bicycle and connects to the same at the bicycle seat post 41 location. The three-point attachment of the T-shaped cart attachment end ensures secure connection with the cart, while the universal joint of the angled member allows the cart to roll, pivot, yaw, and dip relative to the bicycle. This allows the bicycle and the cart to traverse different terrain without placing stress on the connection therebetween.

Many hunting areas do not allow motorized vehicles to enter, which means that it can be a challenge to transport felled game from the area after hunting. Sportsman can create their own makeshift game carriers to affix to a bicycle, but this can be a very time consuming process and such carriers are not always effective. An individual could also carry the game themselves, but that is not always a practical solution, depending upon the size of the game. While several different types of vehicle-attached carts have been provided in the art, the present invention represents a new and novel attachment device that is configured to secure between a bicycle and a game cart. The device is readily attachable to an existing game cart, whereby its structure adapts to the size of the cart, while also easily securing to the seat post of a bicycle. The device can furthermore extend its length to accommodate different bike rear wheel sizes. Overall, the present invention provides users with a convenient way to transport game behind a bicycle for use in hunting areas that do not permit motorized vehicles.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle cart attachment device, comprising:
   a first portion and a second portion, the second portion positioned at an angle with respect to the first portion;
   a distal end of the first portion having a bicycle attachment end;
   a distal end of the second portion having a T-shaped attachment end;
   said T-shaped attachment end comprising a lateral attachment bar extending outwardly and substantially orthogonal from said angled portion;
   said lateral attachment bar having ends comprising a first clevis member and a second clevis member;
   a third clevis member slidably disposed along said second portion;
   the first clevis member, the second clevis member, and the third clevis member each comprising a substantial U-shape and having a securing fastener to enclose said U-shape;
   said bicycle attachment end further comprises a clamp configured to secure to a bicycle seat post.

2. The bicycle cart attachment device of claim 1, wherein: said lateral attachment bar further comprises outwardly extending telescoping portions for positional adjustment of said first clevis member and said second clevis member.

3. The bicycle cart attachment device of claim 1, wherein: said third clevis member is securable to to said second portion via a fastener.

4. The bicycle cart attachment device of claim 1, wherein: said first portion further comprises a telescoping portion to adjust a length of said first portion.

5. The bicycle cart attachment device of claim 1, wherein: said bicycle attachment end further comprises a universal joint.

6. The bicycle cart attachment device of claim 1, wherein the third clevis member is coincident with the second portion.

* * * * *